(No Model.)
L. S. ROBBINS.
METHOD OF PREPARING FOOD FOR ANIMALS.
No. 301,924. Patented July 15, 1884.
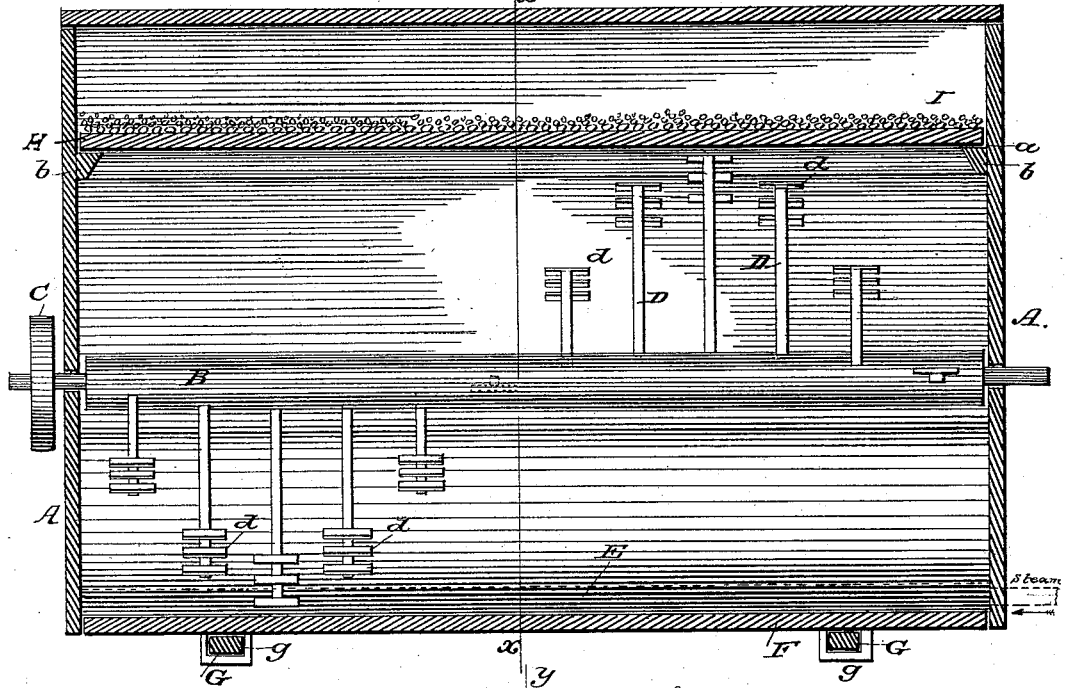
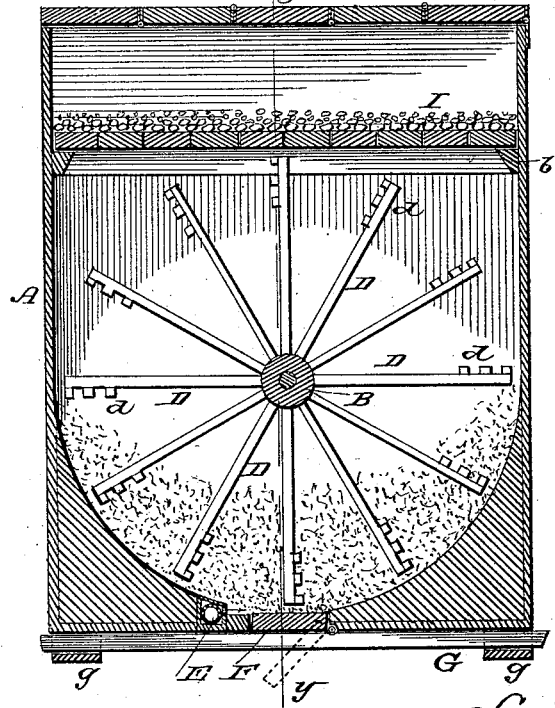
WITNESSES:
INVENTOR.
Louis S. Robbins
ATTORNEYS.

UNITED STATES PATENT OFFICE.

LOUIS S. ROBBINS, OF NEW YORK, N. Y.

METHOD OF PREPARING FOOD FOR ANIMALS.

SPECIFICATION forming part of Letters Patent No. 301,924, dated July 15, 1884.

Application filed April 22, 1884. (No specimens.)

*To all whom it may concern:*

Be it known that I, LOUIS S. ROBBINS, a citizen of the United States, residing at city of New York, in the county of New York and State of New York, have invented certain new and useful Improvements in Preparing Food for Animals, of which the following is a specification, reference being had therein to the accompanying drawings.
My invention relates to the preparation of food for animals from brewer's grain—i. e., grain resulting from the brewing of malt liquors; and it consists, first, in removing from said grain the injurious substances which give them a bitter and unpalatable taste acquired during the brewing process; secondly, reducing the hulls of the grain to a soft and pulpy condition; thirdly, in mixing with the grain thus treated potatoes or other vegetables or cereals largely composed of the elements of starch in certain quantities; fourthly, in subjecting the mass to a cooking process by means of steam, so as to render it homogeneous in character and uniform in quality.
The object of my invention is to produce a healthy and palatable food for animals from materials in part, as received, unhealthy and deleterious, which shall possess the proper nourishing qualities necessary for the particular class of animals to which it is to be fed, and at a cost far below any food now used possessing like amount of nutrition.

In carrying out my invention I prefer to use the apparatus hereinafter described; but it is obvious that other apparatuses differing in construction from the one here shown may be used.

In the drawings similar letters of reference refer to like parts.
Figure 1 is a longitudinal vertical section of my apparatus on the line $y\ y$. Fig. 2 is a cross-section of the same on the line $x\ x$.

A represents a box made of plank, firmly and tightly jointed, and held together with bolts or screws, the lower inner part of which is made semi-cylindrical in form.

B is a shaft passing entirely through the box from end to end, a little below the medial line of height, and having a pulley, C, to attach a belt to revolve the same, and arms D, on the ends of which are cross-pieces $d$.

E represents a steam-pipe perforated inside the box A, and extending from end to end thereof, which pipe is inclosed in a wooden casing of rectangular or other suitable shape, and perforated, like the pipe E, to permit the escape of the steam. The pipe E is inclosed in the wooden casing, to prevent the grain or other material coming in contact therewith from being scorched or burned and baked on the pipe. The incased pipe E is placed about twelve inches to one side of the vertical medial line, as shown in Fig. 2. A trap or door, F, is hinged to the bottom of box A a little to one side of vertical line $y\ y$, for the discharge of the grain, when properly prepared, into trucks or other suitable receptacles. This trap or door is held in a closed position by cross-bars G G, secured in lugs $g\ g$, or by other suitable means.

In box A, at $a$, a rectangular frame H is placed and held in position by supports $b\ b$. This frame carries movable slats I I, on which are held the potatoes or other vegetables during the cooking process, which slats may be moved to one side when the vegetables are sufficiently cooked.

K is a cover to box A, hinged to one side thereof, to be lifted when grain and other materials are placed therein for treatment.

The above-described apparatus may be of any required dimensions; but I prefer to make it of the following dimensions, viz: four feet wide, four feet high, and six or twelve feet in length.

In carrying out my invention, when the apparatus is ready for use, I first introduce the brewer's grain and fill the box about two-thirds full. The slats I I are then spread over the grain, the cover of the box closed down, the steam from a boiler is let into the box A through perforated pipe E, which allows the steam to pass up through the grain, dissolving and carrying off the bitter substances acquired during the brewing process and softening and reducing the hulls of the grain to a pulpy and digestible condition. The shaft B, with arms D, is then put in motion by suitable mechanism to stir the grain. The temperature of the grain in the box is gradually raised to 212° Fahrenheit, when the cover to the box is raised to let the steam pass off. The steaming with an increasing temperature, but preferably not to exceed 230° Fahrenheit, is continued for one hour. It is then stopped long enough to place the potatoes or other vegetables on the slats on frame H, when the steam is again turned on and continued about thirty minutes, or until the potatoes or other vegetables are cooked through, when the slats are pushed to one side and the potatoes or other vegetables allowed to fall into the grain below. The steaming and stirring is then continued until the potatoes or other vegetables become thoroughly mixed with the grain. While the grain and vegetables are being mixed as last above mentioned, I sprinkle in about one quart of fine salt to every twenty-five bushels of the mixture.

After the food has been treated in the manner herein described, the trap or door F is let down by removing the bars G G, and the mass is discharged into a truck or other receptacle, and when sufficiently cooled is ready for use.

I mix the grain with potatoes or other vegetables in about the following proportions, viz: five bushels of the grain to two bushels of potatoes or other vegetables. These proportions may be varied to suit the demands of the animals, and for horses I add to a compound of the proportions and quantity above mentioned one bushel of oatmeal or one-half bushel of cornmeal. If desired, the food may be medicated after or during its treatment for any particular disease with which the animals may be afflicted.

I am aware that the residuum of grain left after distillation of whisky therefrom has been treated and mixed with other materials to render it palatable and nutritious for animals; but such residuum differs in character from the one I treat, and is only subjected during the process of treatment to vinous fermentation and distillation, without the mixing therewith of substances to render it bitter and unwholesome. The residuum which I treat is intentionally made bitter during the process of brewing, and the husks of the grain are left hard and sharp, so that when eaten by animals they produce injurious results. When said residuum is treated by the process herein described, however, the bitterness of the grain is removed, the hard and sharp husks are rendered soft and pulpy, and, enriched by the vegetables or meal added thereto, as set forth, it becomes a palatable and highly nutritious food.

Having thus described my invention, what I claim, and desire to secure by Letters Patent, is—

The herein-described process of treating brewer's grain, so as to render it a palatable and nutritious food for animals, which consists in first heating said grain by steam in a closed box or chamber, and during said heating causing it to be thoroughly and vigorously stirred by suitable mechanical means, then adding thereto vegetables or grains in about the proportions mentioned, which have before been subjected to a cooking process, and then subjecting the entire mass to heat by steam and vigorous stirring by suitable means for a given time, substantially as described.

In testimony whereof I affix my signature in presence of two witnesses.

LOUIS S. ROBBINS.

Witnesses:
M. FASSETT,
E. M. MARBLE.